Feb. 9, 1937. F. L. O'REILLY 2,070,173
FENDER FOR AUTOMOBILES
Filed Sept. 16, 1936 2 Sheets-Sheet 1
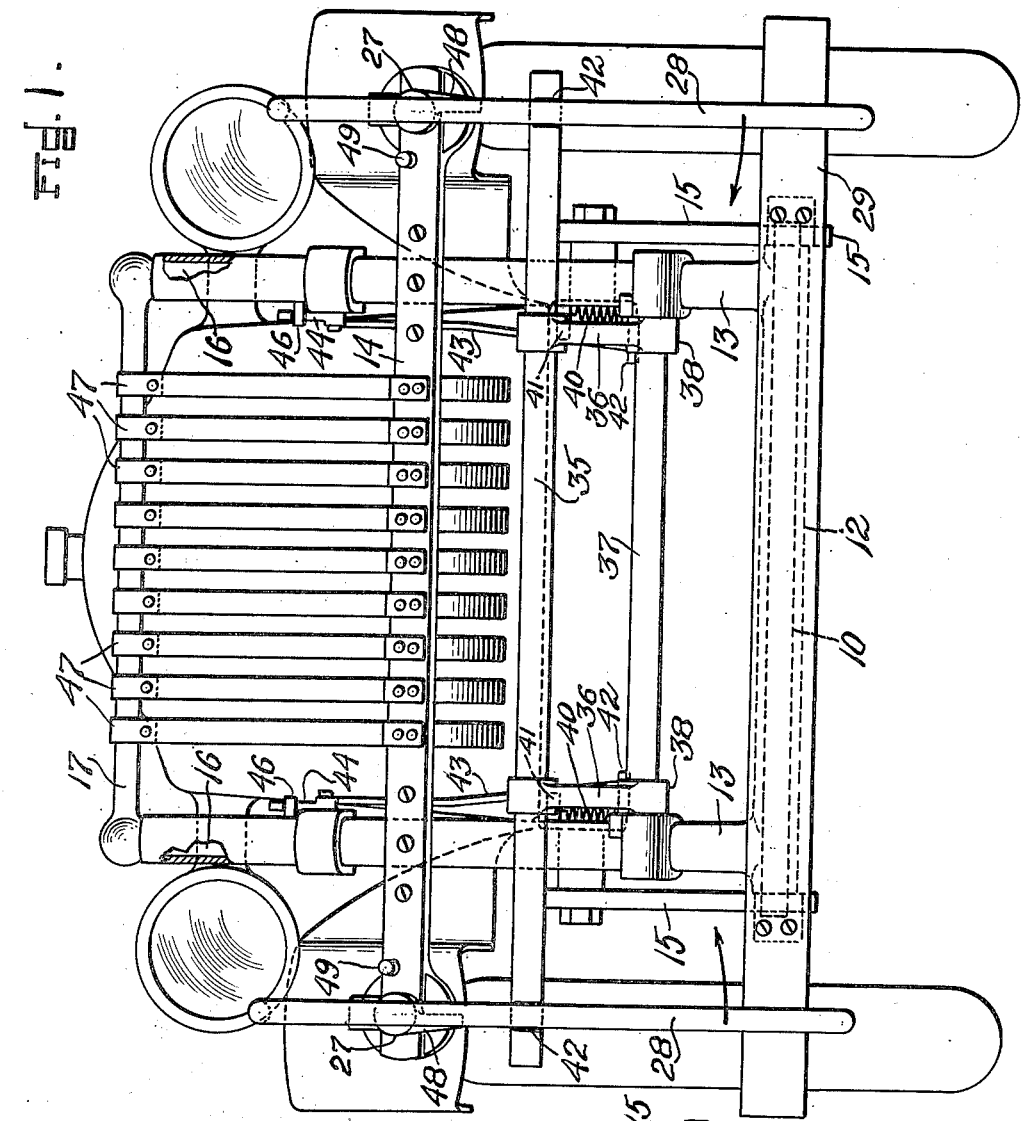
Inventor
Frank L. O'Reilly
By Arthur F. Randall, Atty.

Inventor=
Frank L. O'Reilly.

Patented Feb. 9, 1937

2,070,173

UNITED STATES PATENT OFFICE 2,070,173

FENDER FOR AUTOMOBILES

Frank L. O'Reilly, Winthrop, Mass.

Application September 16, 1936, Serial No. 100,984

6 Claims. (Cl. 293—34)

My invention relates to fenders for vehicles and particularly to fenders for automobiles.

The principal object of the invention is to provide an efficient automobile fender of comparatively simple and inexpensive construction which will operate automatically to prevent a person who is struck by the vehicle from being thrown down and/or run over and which, to a substantial degree, will avoid injury to the person struck through contact with parts of the fender.

To these ends I have provided an improved fender for vehicles, said fender having the features of construction and mode of operation set forth in the following description, the several novel features of the invention being separately pointed out and defined in the claims at the close thereof.

In the accompanying drawings:

Figure 1 is a front elevation of the forward end of an automobile equipped with my new fender.

Figure 2 is a central longitudinal sectional view of one of the upstanding side-bars hereinafter referred to.

Figure 3:
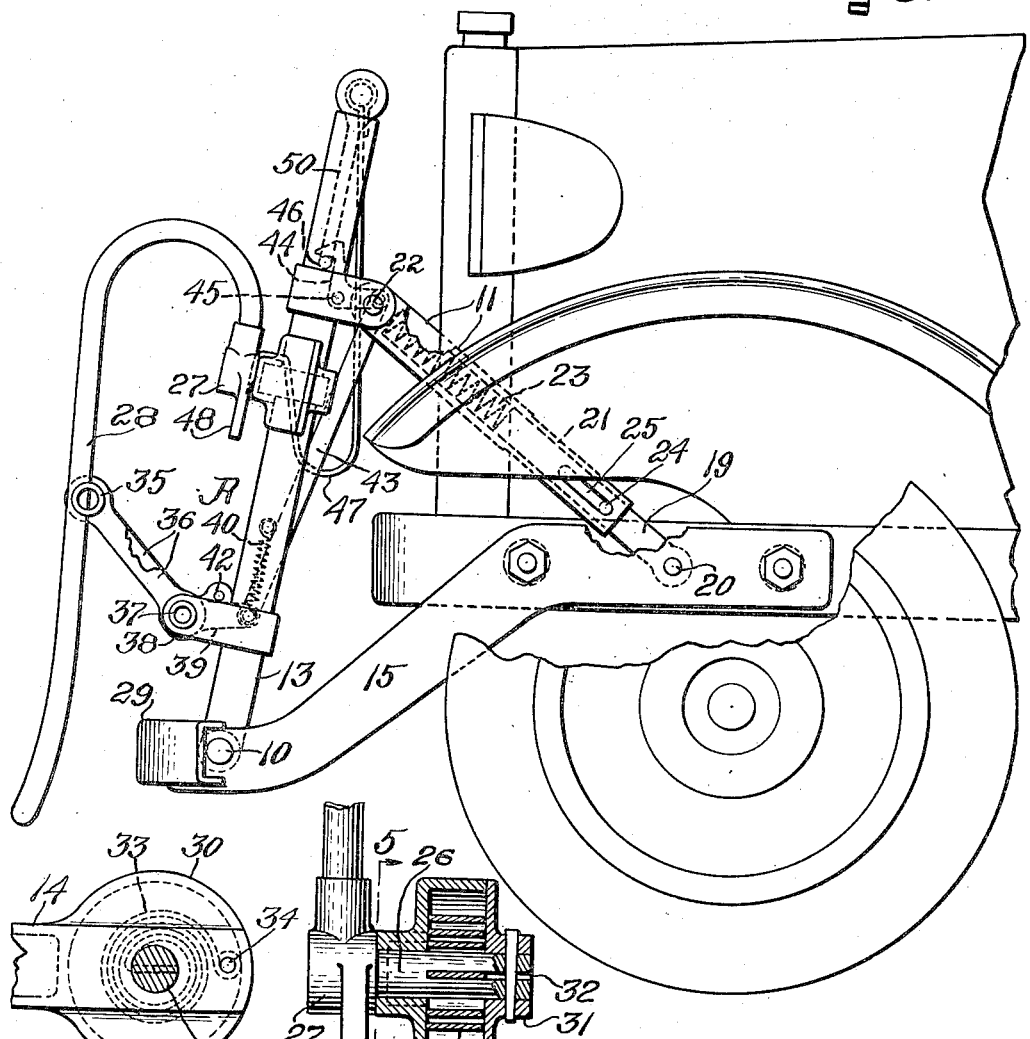
Figure 3 is a side elevation of the parts shown in Fig. 1.

The illustrated embodiment of my invention comprises a fender structure A for automobiles and the like, said structure being pivotally supported at 10 on the frame of the vehicle and maintained in an upright, or approximately upright, position by a pair of spring links or props 11, one of which is disposed adjacent to each side of the structure alongside of the radiator of the vehicle.

The fender structure comprises a main frame consisting of rigidly connected parts 12, 13, 13, and 14 and a supplemental frame section consisting of the rigidly connected parts 16, 16, and 17 slidably supported by the main frame so as to provide for up and down movement thereof relatively to said main frame.

The parts 12 of the main frame is a transversely disposed tubular base bar loosely mounted upon a pivot pintle 10 whose opposite ends are fixed to arms 15 forming parts of the frame of the vehicle. The two parts 13, 13 are tubular upstanding posts rigidly connected at their lower ends with the lower transverse bar 12, while the part 14 is a transversely disposed bar extending across and rigidly fixed to the posts 13.

The parts 16, 16 of the supplemental frame are tubular stems each of which is slidably mounted within one of the posts 13 and seated at its lower end upon a normally compressed coiled spring 18 provided within said post at the lower end thereof as shown in Fig. 2.

Each prop 11, Fig. 3, comprises a stem section 19 one end of which is connected at 20 to the frame of the vehicle and the opposite end portion of which is telescopically and slidably fitted into one end of a tubular section 21 whose opposite end is pivotally connected at 22 to the proximate post 13. Within the tubular section 21 is arranged a coiled spring 23 which normally holds the prop in extended condition with a pin 24 carried by section 19 abutting one end of a slot 25 formed longitudinally in the other section 21. Thus when the fender strikes against the body of a person the springs of the props 11 cushion the blow thereby, to a material extent, reducing the liability of injury to the person that is struck.

Figure 5:
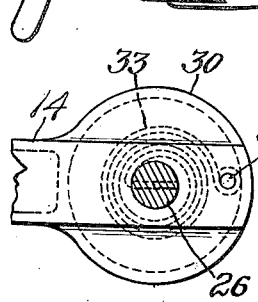
Figures 4 and 5 are details hereinafter described, Fig. 5 being a section on line 5—5 of Fig. 4.
Figure 4:
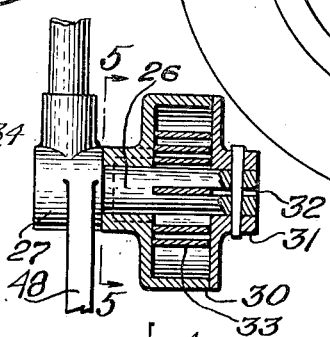

The opposite end portions of the transverse bar 14 project a substantial distance beyond the posts 13 and adjacent to each end of said bar the latter is made with a bearing or journal within which is rotatably mounted a spindle 26, Figs. 4 and 5, whose forward end is rigidly connected with the hub 27 of an arm 28 which extends forwardly and downwardly from said hub with its free lower end disposed a short distance above the roadway and its lower end portion disposed a short distance in front of the usual bumper 29 of the vehicle.

Each spindle 26 extends through a spring box 30 which may be a part of the proximate end portion of the bar 14 and said spindle has fixed on its rear end a flanged collar 31 which co-operates with the hub 27 to hold the spindle against endwise movement in either direction relatively to bar 14, and which may also serve, as shown, as a cover for the spring box 30.

The rear end portion of each spindle 26 is formed with a longitudinal slot 32 as shown in Fig. 4 which is occupied by one end of a coiled spring 33 that is inclosed by box 30 and has its opposite end fastened at 34, Fig. 5, to the front wall of the spring box. This spring 33 is normally under tension and its power is applied to the spindle in a direction tending to swing the arm 28 of said spring inwardly but is normally prevented from doing so by a trip-and-latch bar 35.

The trip-and-latch bar 35 is rigidly connected with a pair of arms 36 extending forwardly and upwardly from hubs 38 that are fixedly mounted upon a transversely disposed rock shaft 37 that is journaled at its opposite ends in bearings provided on the posts 13. Each hub 38 is made with a short rearwardly extending arm 39 to which is connected one end of a coiled spring 40, the opposite end of said spring being fastened at 41 to the proximate post 13.

The trip-and-latch bar 35 is made upon its front side with a pair of notches 42 normally occupied by the arms 28 and which provide abutment shoulders by means of which said arms are held at the limit of their outward swinging movements in opposition to the influence of the tensioned springs 33 whose force is transmitted to said arms in a manner to yieldingly urge the same inwardly in the directions indicated by the arrows in Fig. 1.

The springs 40 yieldingly hold arms 36 and bar 35 at the limit of their forward movement with arms 39 bearing against stop studs 42 projecting from posts 13 and with bar 35 in locking engagement with the arms 28.

The axes of the spindles 26 are disposed lengthwise or longitudinally with respect to the vehicle with which they are associated and it will therefore be clear that when the latter is driven against a person and the body of the latter displaces the trip-and-latch bar 35 rearwardly, the arms 28 are thereby freed whereupon the springs 33 swing said arms inwardly and upwardly, and transversely with respect to the vehicle, as indicated by the arrows in Fig. 1, into positions in front of the person who is struck thereby preventing said person from being thrown forwardly or falling on to the ground and this action of the arms is accompanied by a tendency on the part of the latter to lift the person from the ground. As will be clear the impact of the body against the transverse bar 14 and rock shaft 37 of the fender is cushioned by the springs 23 of the props 11.

Each arm 39 of the trip-and-latch member has pivotally connected with it the lower end of a link 43 whose upper end is pivotally connected with one arm of a bell-crank latch 44 that is pivotally mounted at 45 on the proximate post 13. This latch 44 normally engages a stud 46 carried by the stem 16 that is within said proximate post to hold said stem at the limit of its downward movement and it will be clear that when the trip-and-latch member is swung on the axis of shaft 37 through engagement with the body of the person that is struck it acts through the two links 43 to disengage the latches 44 from the studs 46 whereupon the springs 18 within the posts project the stems 16 upwardly to the limit of their movements in that direction.

Midway between the opposite sides of the fender I provide a plurality of parallel flexible straps 47 each of which has its one end fastened to the cross-bar 17 of the supplemental frame and its lower end fastened to the transverse bar 14.

These straps 47 may be made from woven bands, leather or other suitable material and when the supplemental frame is thrown upwardly by its springs 18 the straps are drawn taut and not only limit the extent of upward movement of said supplemental frame but also provide a yielding barrier that is automatically interposed between the upper part of the body, particularly the head, of the person that is struck and the front end of the vehicle. This yielding characteristic is supplied by the flexible nature of the straps themselves; by the resiliency of the springs 18, and by the resiliency of the props 11.

The hub 27 of each swinging arm 28 is made with an arm 48 which cooperates with a stop stud 49 on the transverse bar 14 to limit the inward swing of the arm so that the latter is approximately horizontal when the arm 48 engages the stop 49.

What I claim is:

1. A vehicle fender comprising a frame supported in front of the vehicle; a body-holding arm pivotally mounted on said frame adjacent to one side of the vehicle so that it can swing transversely on an axis disposed longitudinally with respect to the latter; a spring yieldingly urging said arm to swing transversely toward the opposite side of the vehicle; trip-and-latch mechanism for holding said arm retracted and adjacent to one side of the vehicle where it extends downwardly from its pivot, and means to limit the swinging movement of said arm under the influence of said spring.

2. A vehicle fender comprising a frame supported in front of the vehicle; a pair of body-holding arms pivotally mounted on said frame adjacent to the opposite sides of the vehicle so that they can swing transversely toward and from each other on longitudinally disposed axes; spring means yieldingly urging said arms to swing transversely toward each other; latch mechanism for holding said arms retracted each adjacent to its side of the vehicle where it extends downwardly from its pivot, said latch mechanism being operable by the body that is struck to free said arms, and means to limit the swinging movement of said arms under the influence of said spring means when freed from said latch mechanism.

3. A vehicle fender comprising an upstanding frame pivotally supported adjacent to its lower end to swing on a transverse axis; cushioning mechanism yieldingly opposing rearward swinging movement of said frame; a pair of body-holding arms pivotally mounted on said frame adjacent to the opposite sides of the vehicle so that they can swing transversely toward and from each other on longitudinally disposed axes; spring means yieldingly urging said arms to swing transversely toward each other; latch mechanism for holding said arms retracted each adjacent to its side of the vehicle where it extends downwardly from its pivot, said latch mechanism being operable by the body that is struck to free said arms, and means to limit the swinging movement of said arms toward each other under the influence of said spring means when freed from said latch mechanism.

4. A vehicle fender comprising an upstanding frame pivotally supported adjacent to its lower end to swing on a transverse axis; cushioning mechanism yieldingly opposing rearward swinging movement of the upper portion of said frame; a pair of body-holding arms pivotally mounted on the upper part of said frame, one adjacent to one side of said frame and the other adjacent to the opposite side thereof, so that they can swing transversely toward and from each other on longitudinally disposed axes; spring means yieldingly urging said arms to swing toward each other; latch mechanism for holding said arms retracted each in a depending position adjacent to its side of the vehicle, said latch mechanism including a transversely disposed yieldingly supported trip bar through which the body that it struck operates said latch mechanism to free said arms, and means to limit the inward swinging movements of said arms when freed from said latch mechanism.

5. A vehicle fender comprising an upstanding main frame pivotally supported adjacent to its lower end to swing on a transverse axis; cushioning mechanism yieldingly opposing rearward swinging movement of the upper portion of said frame; a supplemental frame adjacent to the top of said main frame adapted to support the upper part of the body that is struck and mounted on said main frame so that it is movable up and down relatively thereto; spring means yieldingly urging said supplemental frame upwardly; a latch normally locking said supplemental frame in a lower retracted position; a pair of body holding arms pivotally mounted on the upper part of said main frame, one adjacent to one side of the latter and the other adjacent to the opposite side thereof, so that they can swing transversely toward and from each other on longitudinally disposed axes; spring means yieldingly urging said arms to swing toward each other in positions to hold the body that is struck; latch mechanism for holding said arms retracted each in a depending position adjacent to its side of the vehicle, said latch mechanism including a transversely disposed yieldingly supported trip bar through which the body that is struck operates said latch mechanism to free said arms; means to limit the inward swinging movements of said arms when freed from said latch mechanism, and means through which said trip bar acts to operate said first mentioned latch to free said supplemental frame when said trip bar strikes said body.

6. A vehicle fender constructed in accordance with claim 5 wherein said supplemental frame includes a transversely disposed bar adjacent to its upper end, and wherein a plurality of normally slack parallel flexible bands are provided each of which has its one end connected with the transversely disposed bar of said supplemental frame and its opposite end connected with a transversely disposed bar forming part of said main frame and disposed below the transversely disposed bar of the supplemental frame.

FRANK L. O'REILLY.